United States Patent [19]

DeBartolo, Jr.

[11] Patent Number: 5,043,536

[45] Date of Patent: Aug. 27, 1991

[54] ROTATION-LIMITING KNOCKOUT CONFIGURATION

[75] Inventor: Joseph V. DeBartolo, Jr., North Stonington, Conn.

[73] Assignee: Hubbell Incorporated, Orange, Conn.

[21] Appl. No.: 505,594

[22] Filed: Apr. 6, 1990

[51] Int. Cl.$^5$ ............................................... H02G 3/08
[52] U.S. Cl. .................................... 174/65 R; 220/266
[58] Field of Search ................. 174/65 R, 66; 220/266

[56] References Cited

U.S. PATENT DOCUMENTS

| | | | |
|---|---|---|---|
| 3,438,534 | 4/1969 | Zerwes | 220/24.3 |
| 3,619,477 | 11/1971 | Rasmussen | 174/66 |
| 3,877,601 | 4/1975 | Evans et al. | 220/3.3 |
| 3,965,287 | 6/1976 | Mueller | 174/66 |
| 4,627,684 | 12/1986 | D'Amato | 339/206 R |

Primary Examiner—Leo P. Picard
Assistant Examiner—David A. Tone
Attorney, Agent, or Firm—Jerry M. Presson; Walter C. Farley

[57] ABSTRACT

A knockout structure includes two knockout members supported by bridge members in a D-shaped opening through a wall. The knockout members are supported in the opening recessed behind a front surface of the wall. Each connector type is formed with a flat surface at one side which engages the flat portion of the D-shaped opening in the recess region, thereby restraining which ever type of connector is used against rotational motion.

5 Claims, 2 Drawing Sheets

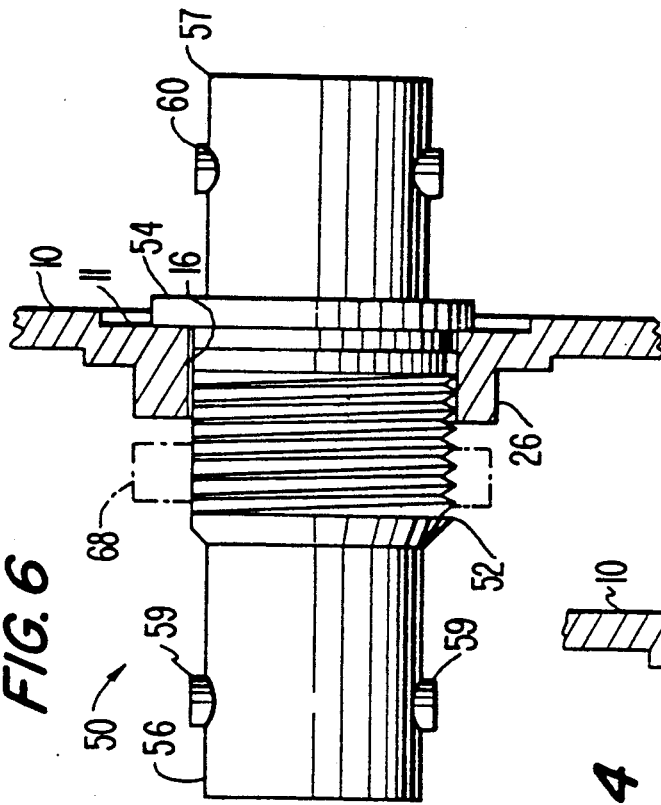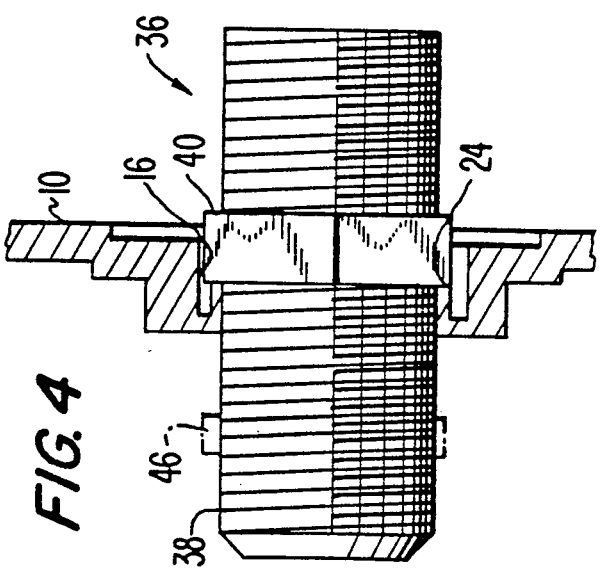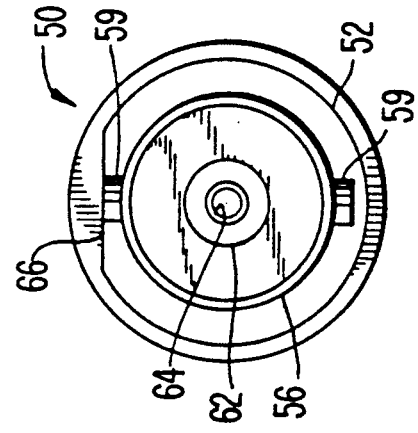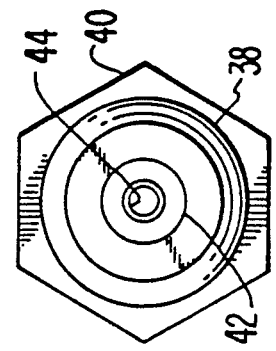

ROTATION-LIMITING KNOCKOUT CONFIGURATION

This invention relates to a knockout structure having two selectively removable portions to permit the insertion of either of two types of connectors and wherein a surface is formed to limit rotational movement of either connector, once inserted.

BACKGROUND OF THE INVENTION

Communication connectors are manufactured in different sizes and shapes to accommodate mating connectors of various types for different purposes. It is desirable to provide mounting openings in various kinds of structures in order to receive such connectors. Openings for this purpose can be formed in the wall of a floor or wall-mounted service box or in a cover plate designed to cover the face of a wall-mounted box which receives communication cables.

For example, a cable television installation is commonly made by running a coaxial cable to the desired location for a television receiver and terminating the cable in a wall-mounted box. A cover plate is then mounted on the box and an opening is formed in the cover plate of a size suitable to receive a television coaxial coupler such as type F-81B which has a threaded end to receive a connector, such as a type F-59 connector, at the end of the wall cable and a threaded portion at the other end to receive a similar cable and connector leading to the television receiver. Connectors of this type have internal conductive components and dielectric mounting elements which are conventional and will not be described herein.

Presently, cover plates having openings formed therein of the proper size to accommodate such a coupler are available. However, it is not always known which type of connector might be necessary to accommodate a communication cable. Data cables and other cable types are often provided with connectors of the bayonet type rather than threaded connectors and the coupler to be mounted in the wall region must obviously have a different size opening for this purpose.

SUMMARY OF THE INVENTION

Accordingly, an object of the present invention is to provide a knockout structure which can be formed in a wall portion in such a way that either of at least two types of connectors can be mounted therein by selectively removing portions of the knockout structure.

A further object is to provide such a knockout structure which includes an opening having a wall surface which abuts or interferes with a surface of the coupler or connector itself, thereby restricting the rotatability of the connector once it is mounted in the wall and thus facilitating attachment and removal of mating connector portions.

Briefly described, the invention comprises a molded wall and knockout structure for receiving either of two sizes of connectors, each connector having a flat peripheral surface, and for preventing rotation thereof. The structure includes a wall having a front surface and means in the wall defining an opening therethrough, the opening having a circular inwardly facing surface portion and a generally flat inwardly facing surface portion lying along a chord of a circle containing the circular surface portion. A first generally annular knockout member is in the opening, the first knockout member having an outer periphery shaped to generally conform to the shape of the wall opening and having a front face recessed inwardly from the front surface of the wall. A second, substantially circular knockout member is positioned within the first knockout member. Bridge members extend radially between the first and second knockout members and the means defining the opening to support the knockout members in the opening, the first and second knockout members being selectively removable to permit insertion of a selected one of the connectors with a flat outer surface thereof abutting the flat chordal surface of the wall opening.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein:

FIG. 3 is an end elevation of a first type of connector insertable into the knockout structure of FIGS. 1 and 2 with an inner knockout member removed;

FIG. 4 is a side elevation, in partial section, of the connector of FIG. 3 inserted into the wall portion of FIGS. 1 and 2 shown in section along line 4—4 and with the inner knockout member removed;

FIG. 5 is an end elevation of a second type of connector which can be accommodated by the knockout structure of the present invention; and FIG. 6 is a side elevation, in partial section, of the connector of FIG. 5 inserted into the wall portion of FIGS. 1 and 2 shown in section along line 4—4 of FIG. 1 with both knockout members removed.

DESCRIPTION OF THE PREFERRED EMBODIMENT

Figure 1:
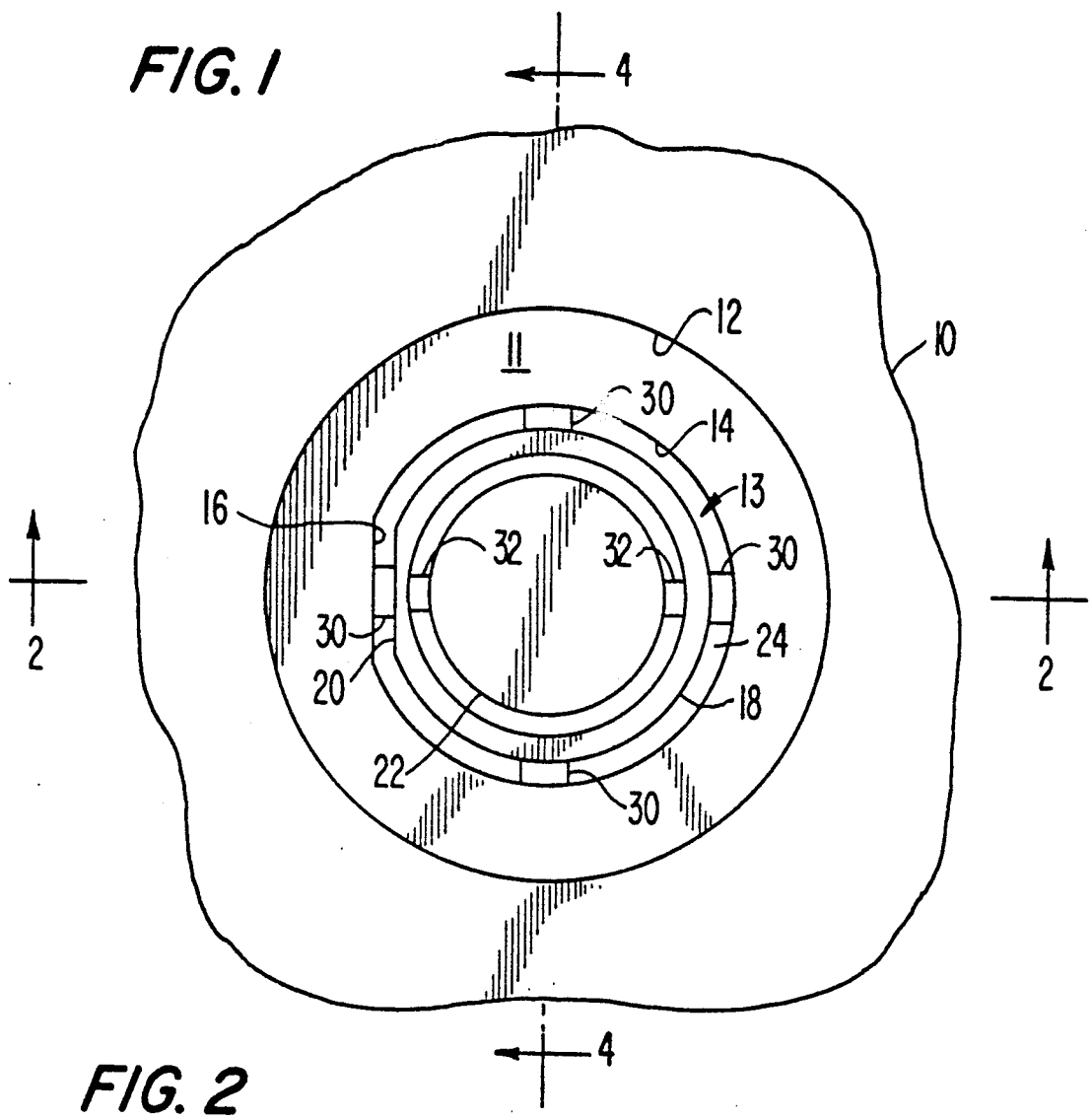
FIG. 1 is a front elevation of a portion of a wall having formed therein a knockout structure in accordance with the present invention.

A knockout structure in accordance with the present invention is shown in a portion 10 of a wall which can be a wall of a box intended to contain a cable termination or junction, or can simply be a portion of a cover plate for closing an opening in a junction box, power pole or the like. Preferably, the wall and knockout structure is molded using a plastic material suitable for injection molding or the like. In the particular embodiment shown, an annular recess 12, seen in FIGS. 1 and 2, surrounds an opening 13 formed through wall 10, the opening having a generally circular inwardly facing wall portion 14 which subtends, in the embodiment shown, an angle of approximately 310°. The remaining 50° is occupied by a flat wall portion 16, the inwardly facing surface of which lies along a chord of a circle containing wall portion 14. The opening thus formed can be regarded as somewhat D-shaped.

Within opening 13 are two knockout members. The first knockout member 18 is an annular member having substantially circular inner and outer surfaces except for a flat, chordal surface 20 which faces outwardly and lies opposite surface 16 of opening 13. Within annular knockout member 18 is a circular disk-like second knockout member 22 having a substantially circular outer surface facing toward knockout member 18. The thickness and other characteristics of knockout member 22 can be varied significantly without affecting the structure of the invention.

Figure 2:
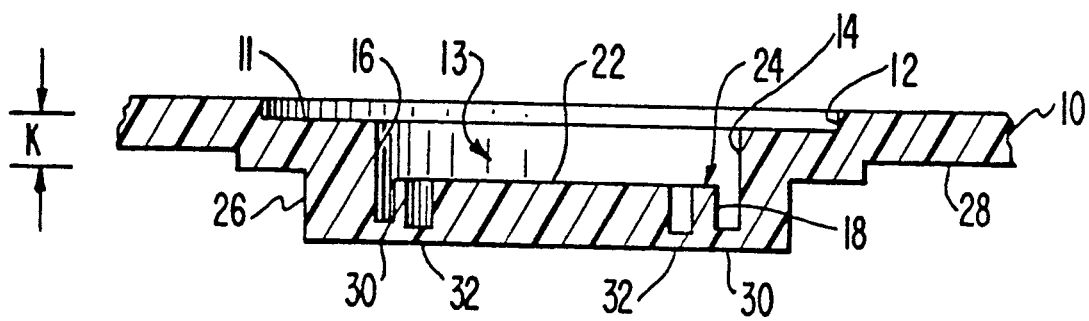
FIG. 2 is a side elevation, in section, along line 2—2 of FIG. 1.

However, it is very important to note that there is a surface 11 which constitutes the front surface of the wall portion surrounding opening 13, and that the front surface 24 of annular knockout member 18 is recessed inwardly of surface 11 by a distance K which is illustrated in FIG. 2. Thus, a portion of radially inwardly facing surface 16 is always exposed.

Also as illustrated in FIG. 2, the thickness of wall 10 is considerably less than the total thickness required for the knockout structure. To accommodate the knockout structure, the wall is formed with a circular boss 26 which protrudes from the rear face 28 of the wall by a distance sufficiently great to accommodate the knockout structure and the recess distance K. The stepped arrangement illustrated in FIG. 2 permits efficient and economical molding arrangements and also minimizes the use of materials.

Knockout members 18 and 22 are supported by a bridge arrangement including four outer bridge members 30 which are separated by 90° and which extend radially between the surrounding wall structure and four locations on bridge member 18; and two bridge members 32 which extend between knockout members 18 and 22 and are separated by about 180°. Preferably, members 32 are aligned radially with two of members 30.

Two primary types of connectors with which this knockout structure is to be used are illustrated in FIGS. 3-6, FIGS. 4 and 6 showing the connectors mounted in wall portion 10 with the selected knockout member or members removed.

A first type of connector indicated generally at 36 is illustrated in FIGS. 3 and 4, this connector being a television coaxial coupler type F-81B. Connector 36 includes an externally threaded barrel 38 which is formed with an annular enlargement 40 intermediate the ends of portion 38, the outer surface of enlargement 40 having a polygonal peripheral surface which, in the form shown, is hexagonal. As seen in FIG. 3, the interior of barrel 38 includes an insulating sleeve 42 of nylon, Teflon or the like and a central opening 44 having electrical contact to receive the central wire of a coax cable.

In order to mount connector 36 in wall 10 having the knockout structure of FIGS. 1 and 2, knockout member 22 is removed by twisting the knockout so as to break bridge members 32. Because knockout member 18 has two additional bridge members, member 32 can be removed by itself without difficulty.

Normally, connector 36 is formed so that barrel 38 is longer on one side of member 40 than on the other. The longer end of barrel 38 is inserted through the opening formed by the removal of knockout member 22 such that an axial face of enlargement 40 abuts surface 24 of knockout member 18. In that position, one of the flat sides of the hexagonal periphery of enlargement 40 is adjacent and substantially parallel with surface 16 which is the flat inwardly facing surface of opening 13. The other surfaces and corners of member 40 simply lie within the recess inwardly of circular wall portion 14. The connector is held in the position shown in FIG. 4 by simply threading a nut 46, shown in phantom lines in FIG. 4 onto the inserted end, which nut engages the rear surface of boss 26.

Any effort to rotate connector 36 in this position, as by threading a mating connector onto either end of barrel 38, can cause slight rotation after which a corner of the hexagonal periphery of enlargement 40 abuts wall portion 16, limiting the rotation to a small amount determined by the clearance between enlargement 40 and wall 16. Typically, the distance between wall portion 16 and the opposite side of the opening is approximately 0.475 in. while the distance between opposite flat surfaces of the hexagonal periphery of enlargement 40 is about 0.440 in. This leaves enough clearance for easy insertion of the connector but does not permit significant rotational movement.

Another form of connector which can be received in wall portion 10 is the connector 50 shown in FIGS. 5 and 6. Connector 50 is provided with a central barrel portion 52 which is externally threaded, a circular flange 54 at one end of the threaded portion and bayonet sleeves 56 and 57 at opposite ends of the connector structure. The bayonet sleeves are provided, in a conventional fashion, with small circular stub bosses 59 and 60, respectively, which are dimensioned to be received in the slots of a well-known mating form of bayonet connector. As with connector 36, the interior of connector 50 is provided with an insulating sleeve 62 of suitable dielectric material and a central conductive opening 64 to receive the central conductor of a coaxial cable.

Of particular importance is the fact that barrel 52 is formed with a flat side 66 so that, as seen in FIG. 5, the outline of the barrel is substantially identical to the shape of D-shaped opening 13 surrounding knockout members 18 and 22. Thus, by removing both knockout members, an opening is formed which matingly receives the barrel, and the connector can be inserted as illustrated in FIG. 6. Retention of the barrel is accomplished by threading a nut 68 onto the exposed threaded portion of the barrel.

As will be recognized, flat portion 16 of opening 13 provides the engagement for a flat surface on either of the connector types described herein. This surface is available because of the recess of the knockout members, particularly member 18, behind surface 11.

While certain advantageous embodiments have been chosen to illustrate the invention, it will be understood by those skilled in the art that various changes and modifications can be made therein without departing from the scope of the invention as defined in the appended claims:

What is claimed is:

1. A molded wall and knockout structure for receiving either of two sizes of connectors, each having a flat outer surface portion, and for preventing rotation thereof, the structure comprising a wall having a front surface;

means in said wall defining an opening therethrough, said opening having a circular inwardly facing surface portion and a generally flat inwardly facing surface portion lying along a chord of a circle containing said circular surface portion;

a first generally annular knockout member in said opening, said first knockout member having an outer periphery shaped to generally conform to the shape of said wall opening, said first knockout member having a front face recessed inwardly from said front surface of said wall;

a second, substantially circular knockout member within said first knockout member; and bridge means extending radially between said first and second knockout members and said means defining said opening to support said knockout members in said opening, said first and second knockout members being selectively removable to permit insertion of a selected one of said connectors with a flat outer surface thereof abutting said flat chordal surface of said wall opening.

2. A structure according to claim 1 wherein said second knockout member has a front face recessed inwardly from said front surface of said wall.

3. A structure according to claim 1 wherein said wall has a thickness less than the length of said connectors and has a back surface, and wherein said means defining said opening comprises
   a generally circular boss protruding from said back surface and surrounding said opening, said boss forming a region of thickness greater than said wall to receive and support said selected connector.

4. A structure according to claim 3 wherein said bridge means includes four bridge members extending radially between said circular boss and said first knockout member and two bridge members extending between said first and second knockout members.

5. The combination of a molded wall and knockout structure and two connectors, said structure being adapted to receive either of the connectors and to prevent rotation thereof, the combination comprising
   a first connector having an externally threaded barrel of a first outer diameter and an annular enlargement fixedly attached to said barrel intermediate the ends thereof, said enlargement having a polygonal peripheral surface;
   a second connector having an externally threaded barrel with a second outer diameter larger than said first outer diameter, said barrel of said second connector having a flat axially extending side, said second connector having a stop flange at one end of said barrel; and
   a molded structure comprising the combination of
   a wall having a front surface;
   means in said wall defining an opening therethrough, said opening having a circular inwardly facing surface portion having a diameter no smaller than said second diameter and a generally flat surface portion lying along a chord of a circle containing said circular surface;
   a first generally annular knockout member in said opening, said first knockout member having an outer periphery shaped to generally conform to the shape of said wall opening and an inner diameter no smaller than said first diameter,
      said first knockout member having a front face recessed inwardly from said front surface of said wall;
   a second, substantially circular knockout member coaxially within said first knockout member; and
   bridge means extending radially between said first and second knockout members and said means defining said opening to support said knockout members in said opening, said second knockout member being removable alone to permit insertion of said first connector with one end of said barrel extending through said first knockout member and said wall opening and with a flat surface of said polygonal peripheral surface of said enlargement thereon abutting said flat chordal surface of said wall opening thereby to prevent rotation of said first connector, and said first and second knockout members being removable together to permit insertion of said second connector with said barrel extending through said wall opening and with a flat surface of said barrel abutting said flat chordal surface of said wall opening thereby to prevent rotation of said second connector.

* * * * *